Nov. 8, 1966 W. A. HICKMAN 3,283,404
WIRE STRIPPER AND CUTTER WITH GEAR-FORM WHEEL ELEMENT
TO VARY CLOSING POSITIONS AND TO IMMOBILIZE JAWS
Filed Sept. 23, 1965
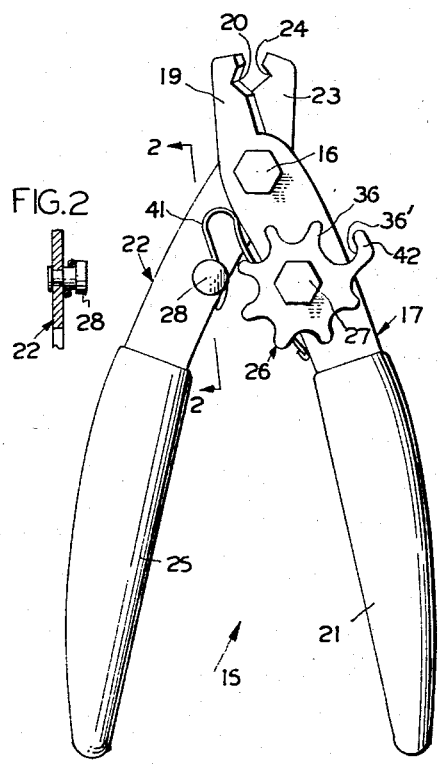
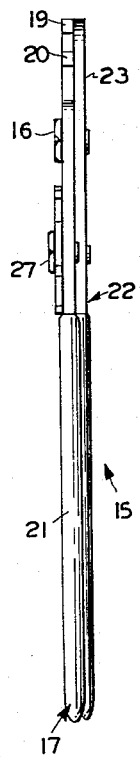
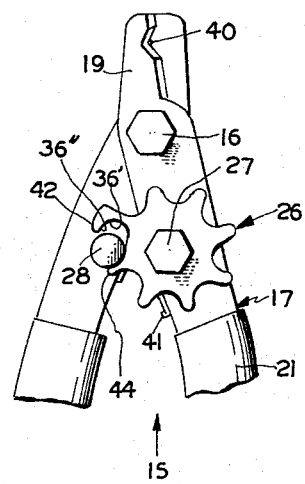
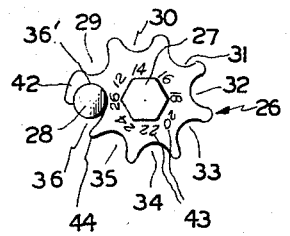
INVENTOR,
WALTER A. HICKMAN,
BY
ATTORNEY.

United States Patent Office 3,283,404
Patented Nov. 8, 1966

3,283,404
WIRE STRIPPER AND CUTTER WITH GEAR-FORM WHEEL ELEMENT TO VARY CLOSING POSITIONS AND TO IMMOBILIZE JAWS
Walter A. Hickman, Hamden, Conn., assignor to General Hardware Mfg. Co., Inc., New York, N.Y., a corporation of New York
Filed Sept. 23, 1965, Ser. No. 489,676
4 Claims. (Cl. 30—91.2)

The present invention relates to a plier-type tool for stripping and cutting insulated wires, and more particularly to the type which is spring-based to open and is adjustable as the extent it is to close when serving as a stripper. For cutting, it is a shear whose blades pass one another.

The principal object of this invention is to provide a novel and improved wire stripper and cutter of the character mentioned, having a rotatable wheel element which serves as an adjustable gage for limiting movement of the cutter elements towards each other, and in addition, said wheel shall also serve to lock the plier in closed condition, or when nearly so.

Another object thereof is to provide a novel and improved wire cutter and stripper of the kind set forth, having the mentioned attributes, and which is simple in construction, reasonably cheap to manufacture, easy to use and efficient in carrying out the purposes for which it is designed.

Other objects and advantages will become apparent as this disclosure proceeds.

For one practice of this invention the plier jaws are shear blades, the cutting edge of each, having a notch. As the jaws are brought together, these notches form a hole, the size of which decreases as the plier parts are closed further. Towards handle end, but near to the pivotal joint of the plier parts, one of said parts has a wheel element rotatably mounted thereon about an axis parallel to that of said joint, while the other of said parts has a pin extending therefrom in the direction of said axes, to intercept said wheel's periphery upon closing movements of said plier. The wheel element is preferably a gear-form, each notch of which will admit said stop pin to notch bottom. However, the distances from wheel axis to the wheel notch bottoms are different respectively in order to attain different sizes for the hole made by the cooperating blade notches. A tool as thus far specifically described, is known, with bias to open.

My improvement consists of having the radial distances to the respective distal ends of each of the teeth except one, equal. (These teeth referred to being the gear teeth.) The radial distance to that one tooth is longer. Such particular longer tooth has a notch in one side edge thereof as an extension of the particular radial notch at that side edge of said tooth. Hence, said particular tooth is a hook-form. When the wheel is in such position that the pin is entered as far as possible into said particular radial notch when the plier is closed, a slight turn of the wheel will cause entry of the pin into said notch extension in which it fits, whereby the hook will engage the pin and hold the plier closed.

In the accompanying drawing forming part of this specification, similar characters of reference indicate corresponding parts in all the views.

FIG. 1 is a front view of a wire stripper and cutter embodying the teachings of this inventon.

FIG. 2 is a fragmentary section taken at line 2—2 in FIG. 1.

FIG. 3 is an end view of FIG. 1.

FIG. 4 is a fragmentary front view of the tool showing the plier closed to an extent determined by the radial wheel notch aside the hook tooth. A slight turn of the wheel now, would bring the hook in position whereby the plier is locked.

FIG. 5 is a front view of the wheel set in locking position where it engages the stop pin.

In the drawing, the numeral 15 designates generally a wire stripper and cutting plier made of two parts pivoted at 16. The part 17 comprises a jaw at one end which is the sheer blade 19 having a notch 20 in its cutting edge, and its other end is a handle 21. The part 22 comprises a jaw at one end which is the companion sheer blade 23 having a notch 24 in its cutting edge, and its other end is the handle 25. Towards handle end, but near the pivotal joint 16, the part 17 has a wheel element denoted generally by the numeral 26, rotatably mounted thereon about an axis 27 parallel to the axis 16, while part 22 has a pin 28 extending therefrom in the direction of said axes, in position to intercept said wheel's periphery upon closing the plier 15. The wheel element 26 is preferably a gear-form whose, each of notches 29–36, will admit said stop pin 28 to notch bottom. The distances from wheel axis 27 to the bottoms of said notches 29–36 are different respectively in order to attain different sizes for the hole 40 formed by the cooperating blade notches 20 and 24, when the blades' distal ends overlap. A substantially U-shaped wire blade spring 41 carried around the pin 28, with its ends bearing against the opposite side edges of the plier parts 17 and 22, bias the plier to open. A tool as set forth in this paragraph is known.

The radial distances to the respective distal ends of each of the gear teeth except 42, are equal, while such distance as to the tooth 42 is longer. This tooth 42 has a notch 36' in one side edge thereof as an extension of the radial notch 36 at that side edge of said tooth 42. Hence, said tooth 42 is a hook-form.

The wheel 26 carries indicia 43 at each of the notches 29–36, to indicate the size of the hole offered as at 40, when the wheel is set in position for the pin 28 to enter one of said notches 29–36 and the plier closed, as is well known.

To lock the plier 15 in closed position, or substantially so, for the hole 40 is of extremely small size, set the wheel 26, which is not free turning, so that when the plier is closed, the spring 41 will be stressed, and the pin 28 will be entered into the notch 36 as in FIG. 4. Now shift the wheel so that said pin shall enter the notch extension 36' into which said pin fits, as shown in FIG. 5, whereupon the plier is locked against opening.

The direction of the notch 36 is substantially radial from the axis 27. The direction of the notch extension 36' is substantially concentric in relation to the axis 27.

The radial distance from the farthest edge 36'' of the notch extension 36', is at least equal to the radial distance to the distal end of the gear tooth 44 which is opposite the entrance of said notch extension, to facilitate getting the hook 42 onto the stop pin 28, and for convenient turning of the wheel 26, and to set out the hook prominently, the radial distance to the said farthest edge 36'' of said notch extension, is at least equal to the radial distance to the distal end of any of the teeth away from said notch extension. The hook tooth 42 is thus the longest.

This invention is capable of numerous forms and various applications without departing from the essential features herein disclosed. It is therefore intended and desired that the embodiments herein shall be deemed illustrative and not restrictive and that the patent shall cover all patentable novelty herein set forth; reference being had to the following claims rather than to the specific description and showing herein to indicate the scope of this invention.

I claim:
1. In a tool for stripping the insulation off wires and for cutting wires, comprising two pivotally connected parts, each having a shear blade at one end and a handle at the other end; said blades and handles being at corresponding ends of said parts; each blade having a notch in its cutting edge; said blades cooperating as a sheer; said notches forming a hole upon movement of said handles towards each other, and a spring biasing said parts to move said handles and shear blades apart whereby said notches are apart, the improvement consisting of a wheel element of gear-form, frictionally rotatably mounted on one of said parts on an axis parallel to the axis of said pivotal connection, and a stop pin extending from the other of said parts, positioned to intercept the periphery of said gear-form and selectively fit into the peripheral radial notches of said gear-form, between the teeth of said gear-form upon movement of said handles towards each other; one of the teeth of said gear-form having a notch in one side edge thereof as an extension of the radial notch in said gear-form at said side edge whereby said one tooth is a hook-shape; said pin being adapted to fit into said notch extension and to enter same from said radial notch it is an extension of, and when in said extension notch, to maintain said parts against relative movement; the radial distances to the bottoms of the radial notches being respectively different; the radial distance to the bottom of the radial notch having said extension notch being one of the shortest of said distances; said handles being normally apart so that said wheel can be turned to position any chosen of its radial notches to be entered into by said pin upon movement of the handles towards each other.

2. A tool as defined in claim 1, wherein the pivotal connection of said parts is intermediate the shear blades and the handles whereby the tool is of the plier type.

3. A tool as defined in claim 1, wherein the radial distance to the farthest edge of the notch extension is at least equal to the radial distance to the distal end of the gear tooth which is opposite the entrance to said notch extension.

4. A tool as defined in claim 1, wherein the radial distance to the farthest edge of the notch extension is at least equal to the radial distance to the distal end of any of the teeth away from the notch extension.

References Cited by the Examiner
UNITED STATES PATENTS

| | | | |
|---|---|---|---|
| 450,342 | 4/1891 | Schollhorn | 30—262 X |
| 3,130,616 | 4/1964 | Miller | 81—341 X |

FOREIGN PATENTS 1,046,133  12/1958  Germany.

WILLIAM FELDMAN, *Primary Examiner.*

MILTON S. MEHR, *Examiner.*